(12) United States Patent
Wanni et al.

(10) Patent No.: US 8,002,983 B2
(45) Date of Patent: Aug. 23, 2011

(54) BACK FLUSHABLE STRAINER DEVICE

(75) Inventors: Amar S. Wanni, Falls Church, VA (US);
Thomas M. Rudy, Warrenton, VA (US);
Claude A. Lafleur, Baton Rouge, LA
(US); Clifford A. Hay, Baton Rouge,
LA (US); Tomas R. Melli, Haymarket,
VA (US)

(73) Assignee: ExxonMobil Research & Engineering Company, Anandale, NJ (US)

( * ) Notice: Subject to any disclaimer, the term of this patent is extended or adjusted under 35 U.S.C. 154(b) by 863 days.

(21) Appl. No.: 11/783,486

(22) Filed: Apr. 10, 2007

(65) Prior Publication Data

US 2008/0251467 A1    Oct. 16, 2008

(51) Int. Cl.
*B04C 5/23*    (2006.01)
*B01D 29/58*    (2006.01)

(52) U.S. Cl. ........ 210/304; 210/313; 210/316; 210/411; 210/512.1

(58) Field of Classification Search .................. 210/304, 210/313, 512.1, 787, 798, 108, 427, 411, 210/316

See application file for complete search history.

(56) References Cited

U.S. PATENT DOCUMENTS

| | | | | |
|---|---|---|---|---|
| 748,821 A * | 1/1904 | Wackerow | ..................... | 210/136 |
| 1,726,839 A * | 9/1929 | Kasztory | ....................... | 210/266 |
| 3,414,129 A * | 12/1968 | Going et al. | .................. | 210/798 |
| 3,712,373 A | 1/1973 | Bearden et al. | | |
| 3,823,831 A | 7/1974 | LeBlanc, Jr. | | |
| 4,264,446 A * | 4/1981 | Fregeau | ......................... | 210/356 |
| 5,024,771 A | 6/1991 | Chiarito | | |
| 5,078,875 A * | 1/1992 | Losing | ........................... | 210/295 |
| 5,478,484 A * | 12/1995 | Michaluk | ...................... | 210/788 |
| 5,698,014 A * | 12/1997 | Cadle et al. | ...................... | 96/157 |
| 6,540,914 B1 | 4/2003 | Smith | | |
| 7,000,782 B2 | 2/2006 | Walton et al. | | |
| 7,032,760 B2 | 4/2006 | Walton et al. | | |
| 7,048,865 B1 * | 5/2006 | McGee et al. | ................. | 210/787 |
| 7,105,090 B2 | 9/2006 | Choo | | |
| 7,166,230 B2 * | 1/2007 | Nilsen et al. | ................... | 210/739 |
| 2004/0020860 A1 * | 2/2004 | Schmigel et al. | .............. | 210/744 |

FOREIGN PATENT DOCUMENTS

| | | |
|---|---|---|
| DE | 2 065 223 | 12/1970 |
| DE | 195 21 741 A1 | 12/1996 |
| DE | 199 14 674 C1 | 12/2000 |
| JP | 60007914 | 1/1985 |
| WO | WO 93/01877 | 2/1993 |
| WO | WO 97/37746 A | 10/1997 |

OTHER PUBLICATIONS

International Search Report, PCT/US2008/004662, mailed Sep. 4, 2008.
Written Opinion, PCT?US2008/004662, mailed Sep. 4, 2008.

* cited by examiner

*Primary Examiner* — Terry K Cecil
(74) *Attorney, Agent, or Firm* — Glenn T. Barrett

(57) ABSTRACT

A strainer device for a fluid flow circuit removes debris and solid particles from the fluid flow to prevent plugging and reduce fouling of the system. The assembly includes a chamber that can be hydrocyclonic, a collection area, a screen assembly and a distributor that allows selective connection to a flushing fluid. The fluid flows through the chamber past the strainer device, with large particles collecting in the collection area under the influence of gravity and smaller solid particles being collected in the screen assembly. Particles can be flushed from the system by selectively activating the distributor to back flush the screen assembly and sweep the collection area free of solid particles without disassembling the system.

7 Claims, 4 Drawing Sheets

BACK FLUSHABLE STRAINER DEVICE

BACKGROUND OF THE INVENTION

1. Field of the Invention

This invention relates to strainer devices and, in particular, to devices for removal of unwanted debris and other solid material from fluid-flow streams and the method of removal.

2. Discussion of Related Art

Fluid flow streams often include debris or solid materials carried in the fluid. This can pose a problem for restricted flow passages with respect to plugging and fouling, which is the accumulation of material on the surface of a flow passage. Many industries utilize flow streams and are adversely affected by plugging and fouling problems. As a result, most flow circuits need straining to remove debris and solid materials from a fluid flow. One industry that experiences this problem is the petrochemical processing or petroleum refining industry.

A device commonly used in this industry, as well as other industries, is a heat exchanger that operates by flowing fluid past a heat exchange surface. The surface can be created by bundles of tubes mounted in a shell to effect heat exchange between the fluid stream flowing through the tubes and another fluid that flows within the space between the tubes in the tube bundle and between the tube bundle and the shell. As this type of heat exchanger works well with a large surface area available for heat exchange, the exchangers are designed with a large number of small diameter tubes mounted in a tight bundle and carried in a shell to create a large cumulative heat exchange surface. Debris that flows into a heat exchanger can become trapped at the entrance to the tubes or in between the tubes within a shell. Entrapment of debris leads to excessive pressure drops and "dead zones" where fluid cannot flow. This condition aggravates in-situ fouling and decreases heat-transfer capabilities and efficiencies. This can lead to frequent required cleaning of these devices. Such cleaning can be cumbersome, expensive, and time-consuming. It can also lead to considerable through-put losses.

To strain the fluid and remove solids, a strainer can be used in the flow path. A common strainer device is a bucket strainer. Bucket strainers function by simply screening the fluid flow and collecting the solids in the screen. However, they tend to clog quickly and cleaning is arduous. For example, each bucket strainer can take about two crew days to clean. As a result, the bucket strainers are not cleaned as often as they should be and are not viewed favorably by plant operators.

Since current state-of-the-art strainer devices are cumbersome to maintain, they are not used as often as necessary. This decreases system efficiency and, in the context of a refinery operation, also can add to increased fouling, which is a significant problem in this setting.

There is a need for a device for straining and method of cleaning flow passages that does not require disassembly of the system.

SUMMARY OF THE INVENTION

As aspect of embodiments of this device provides a strainer assembly for use in a fluid flow circuit that can be cleaned on line and does not require disconnection from the circuit.

Another aspect of embodiments of this device provides a debris settling area disposed away from screening elements for collection of high density debris so as to provide an efficient screening operation.

A further aspect of this device provides a strainer assembly that can be maintained at long intervals, for example only at plant turn arounds, and remain effective in the interim.

The invention is directed to a strainer device comprising a main chamber with a hollow interior with a top and a bottom and an inlet and an outlet coupled to the chamber, wherein a fluid flow path is defined from the inlet to the outlet through the hollow interior of the main chamber. The device includes a collection area connected to the bottom of the main chamber, wherein the collection area is offset from the flow path. A distributor is connected to the top of the main chamber for selective connection to a flushing fluid source. A screen assembly is positioned within the hollow interior between the inlet and the outlet and between the distributor and the collection area, wherein the screen assembly includes at least one screen element with openings sized to collect solid particles from fluid flowing in the fluid flow path.

The strainer device may be provided in combination with a fluid flow circuit having an in-flow line and an out-flow line connected to the inlet and the outlet of the strainer device, respectively. A by-pass assembly may be connected to the in-flow line and the out-flow line in parallel to the strainer device, wherein the by-pass assembly includes a by-pass line and a by-pass valve coupled to the in-flow line upstream of the inlet.

The main chamber may be a hydrocyclone. The inlet may connect to the main chamber at a tangent. The main chamber has a longitudinal axis that may be generally vertically oriented with the inlet and the outlet transversely connected to the main chamber. The inlet may be disposed vertically below the outlet. The main chamber may also be generally horizontally oriented with the inlet and the outlet coextensive with the hollow interior of the main chamber.

The collection area may extend from the bottom of the chamber, may extend outwardly at an angle from the chamber or may extend at a generally vertical angle to the chamber.

A valve may be coupled to the inlet and a valve may be coupled to the outlet to selectively permit or prevent fluid flow within the hollow interior of the main chamber. A valve may be coupled to the distributor to selectively permit back flushing fluid into the hollow interior of the main chamber. A valve may be coupled to the collection area to selectively permit removal of solid particles from the collection area.

The screen assembly may include a plurality of spaced screen elements, with each screen element having openings progressively smaller in the direction of the fluid flow path. The plurality of spaced screen elements may be formed as a unit. The at least one screen element may have a conical shape tapered in the direction of the fluid flow path or may have a flat shape and may be disposed at an angle to the fluid flow path. The lower edge of the screen element may be angled toward the collection area.

The strainer device may be provided in combination with a heat exchanger or in combination with a refinery operation.

The invention is also directed to a method of straining particles from a fluid flow circuit comprising a chamber having a hollow interior for fluid flow and a screen assembly disposed in the chamber, providing an inlet to the chamber and an outlet to the chamber and defining a flow path therebetween that passes through the screen assembly, and providing a debris collection area offset from the flow path and in communication with the hollow interior of the chamber. A fluid is allowed to flow through the chamber in the fluid flow path. Solid particles are collected from the fluid flow on the screen assembly by allowing the fluid flow to pass through the screen assembly. Solid particles are also collected by falling from the fluid flow under the force of gravity into the debris collection area. The collected particles are flushed from the screen assembly in the chamber by introducing a back flushing fluid flow to the chamber that flows through the screen assembly in a direction opposite to the usual or normal flow path. The back flushing fluid flow sweeps the collected particles into the collection area. Finally, collected particles are disposed of from the collection area.

The method may include diverting the fluid flow from the chamber when the back flushing fluid flow is introduced to the chamber.

Flushing the collected particles may include closing the inlet and the outlet to the chamber and opening a back flush valve connected to the chamber and a debris valve connected to the collection area. Introducing the back flushing fluid flow to the chamber may include connecting a back flush fluid source to the chamber.

Providing the screen assembly in the chamber may include providing at least one screen element with openings sized to impede solid particles in the fluid flow. The screen elements may be a plurality of staged screen elements, each screen element having progressively smaller openings to impede different sizes of particles. The screen elements may be supported in a spaced relationship with a screen element having smaller openings being disposed downstream of a screen element having relatively larger openings.

Providing a chamber may include vertically orienting the chamber such that the inlet is vertically below the outlet. The chamber may be a hydrocyclonic chamber. The debris collection area may be positioned adjacent to the bottom of the chamber. The chamber may also be provided horizontally. The debris collection area can extend outwardly from a bottom of the chamber. The debris collection area can extend at an angle from the chamber or at a right angle.

The method may be practiced in combination with a heat exchanger operation. Flushing and disposing of the collected particles can occur on-line with the heat exchange operation. The method may also be practiced in combination with a petroleum refining process.

These and other aspects of the invention will become apparent when taken in conjunction with the detailed description and appended drawings.

BRIEF DESCRIPTION OF THE DRAWINGS

The invention will now be described in conjunction with the accompanying drawings in which.

In the drawings, like reference numerals indicate corresponding parts in the different figures.

DETAILED DESCRIPTION OF EMBODIMENTS OF THE INVENTION

The invention is directed to a strainer device for use in a fluid flow circuit, which can be used with any type of process stream or fluid in various industrial settings. The device is described in the context of a refinery setting with a flow of crude oil, especially through a heat exchanger. However, those of ordinary skill in the art will appreciate that the device and method of using the device disclosed herein are not limited to petroleum or petrochemical processing and can be utilized in various industries in which fluid flow circuits are employed.

The negative impact on a fluid flow circuit that experiences plugging is discussed above and relates to reduced or entirely blocked flow and loss of efficiency and required cleaning. It has also been discovered that debris mitigation can reduce in-situ fouling, which will positively impact system efficiencies. Fouling is a significant problem in many industries, in particular petrochemical processing and petroleum refining operations. Transmission of debris, which is brought into the system by crude streams entering the plant or created in equipment in the plant, for example, is a substantial contributor to the overall fouling problem. The presence of debris leads to rapid plugging of heat exchanger tubes, both in the inner tube diameter and between the tubes in a shell, which leads to throughput losses. In accordance with the invention, strategic entrapment and removal of debris and other solid material will substantially decrease the rate of in-situ fouling. Certain streams, such as crude preheat trains, slurry pump-around circuits, experience significant tube plugging and require frequent cleaning, as often as every few weeks.

Figure 1:
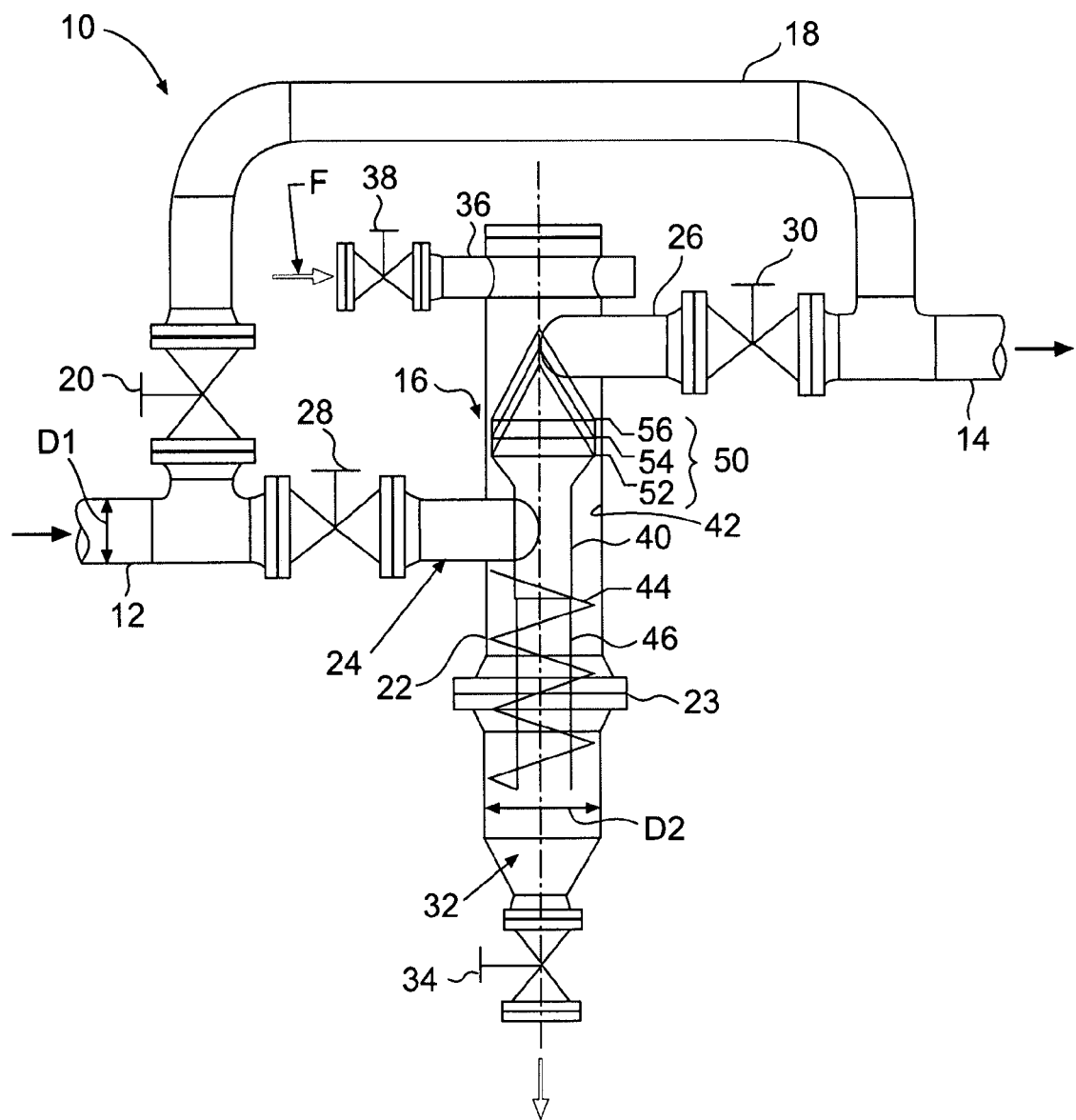
FIG. 1 is a schematic diagram of a flow circuit with a strainer device including a screen assembly in accordance with the invention.

The device is illustrated in the figures. FIG. 1 shows a fluid flow circuit 10 with an in-flow line 12 and an out-flow line 14 defining at least two flow paths therebetween. The in-flow line 12 and the out-flow line 14 are formed of conduits having an inner diameter D1. A strainer device 16 is positioned in a first flow path and is located between the in-flow line 12 and the out-flow line 14. A by-pass line 18 with a by-pass valve 20 is also coupled between the in-flow line 12 and the out-flow line 14 in parallel with the strainer device 16. The by-pass line 18 forms a second flow path. Preferably, the by-pass line 18 has the same inner diameter D1 so as to maintain a constant flow velocity during a by-pass flushing operation, discussed in detail below.

The strainer device 16 is formed of a main chamber 22 having inlet 24 in the form of a nozzle, preferably a tangential nozzle, and an outlet 26. The inlet 24 and the outlet 26 are horizontally oriented and aligned with the in-flow line 12 and the out-flow line 14, respectively. The inner diameter of the main chamber 22 has a diameter D2 that is about 1.5 to 2 times greater than the inner diameter D1 of the in-flow line 12 and out-flow line 14. For example, the main chamber 22 may be made of an 18 inch or 20 inch pipe with the process pipe having an inner diameter of 10 inches. Other diameters are contemplated and considered to be within the scope of the present invention provided D2>D1. It is also contemplated that the diameters of the in-flow line 12 and inlet 24 may differ.

The inlet 24 is connected to the in-flow line 12 by an inlet valve 28. The outlet 26 is connected to the out-flow line 14 by an outlet valve 30. As seen in FIG. 1, the chamber 22 is vertically oriented, and the outlet 26 is disposed vertically higher than the inlet 24. The bottom of the chamber 22 has a heavy debris collection area 32 with a debris valve 34 disposed at the lowermost portion of the collection area 32. The top of the chamber 22 has a distributor or sparger 36 with a back flush valve 38. The back flush valve 38 is configured to be connected to a flushing fluid source F with a nozzle, for example.

The main chamber 22 has an internal line 40 positioned in the center of the main chamber 22, thus forming an annular flow path 42 within the main chamber 22 through which the incoming fluid flows. Blocking plates (not shown) can be provided, as known, to impart the highest possible centrifugal velocity to the fluid flow. The main chamber 22 acts as a hydroclonic chamber, as is known, with fluid swirling downward from the inlet 24 and upward through the internal pipe 40 in the central portion of the main chamber 22 toward the outlet 26. A helical guiding vane 44 is provided within the main chamber 22 near the inner wall, as seen in FIG. 1, adjacent to the annular flow path 42 so that the fluid flow will continue swirling downward. More than one vane 44 may be provided, if desired. The internal pipe 40 may be provided over a short vertical length, for example a length equal to about two diameters of pipe, while the vane 44 can extend below the internal pipe 40 on supports, such as rods or struts 46. Debris more dense than the liquid slides down the inner wall of the main chamber 22 to the collection area 32 as the fluid flows downward from the inlet 24. The fluid then turns and flows upward through the internal pipe 40 toward the outlet 26.

Figure 2:
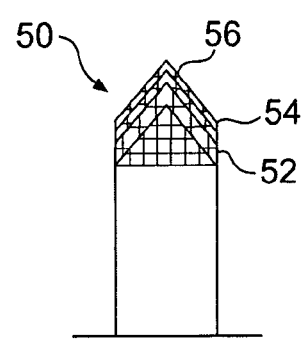
FIG. 2 is a side view of a screen assembly for use with the flow circuit of FIG. 1.

A screen assembly 50 is provided within the main chamber 22 between the inlet 24 and the outlet 26. The screen assembly 50 includes at least one screen element or a plurality of vertically spaced, staged screen elements, which in this case includes a first screen 52, a second screen 54, and a third screen 56. The screens 52, 54, 56 are provided with progressively smaller openings in the direction of flow, i.e. upward, as seen in FIG. 2. For example, the lowermost, first screen 52 may have 1 inch openings, the middle, second screen 54 may have ½ inch openings, and the topmost, third screen 56 may have ¼ inch openings. If a fourth screen is provided above the third screen 56, the openings may be ⅛ inch, for example. For fluid streams having smaller particles, the screen sizes may range from ½ inch to 1/16 inch openings, for example. Of course, any number of screen elements may be used with variably sized openings depending on the particular use intended for the assembly. The spacing between screens can vary or be constant. For instance, the screens 52, 54, and 56 may each be spaced 2 to 3 inches apart.

The screen assembly 50 can include variously shaped screen elements. As seen in FIG. 1, the screens 52, 54, and 56 are conical. They may also be tapered upwardly and have flat tops. Alternatively, each screen element may be flat and disposed horizontally or at an angle.

Figure 3:
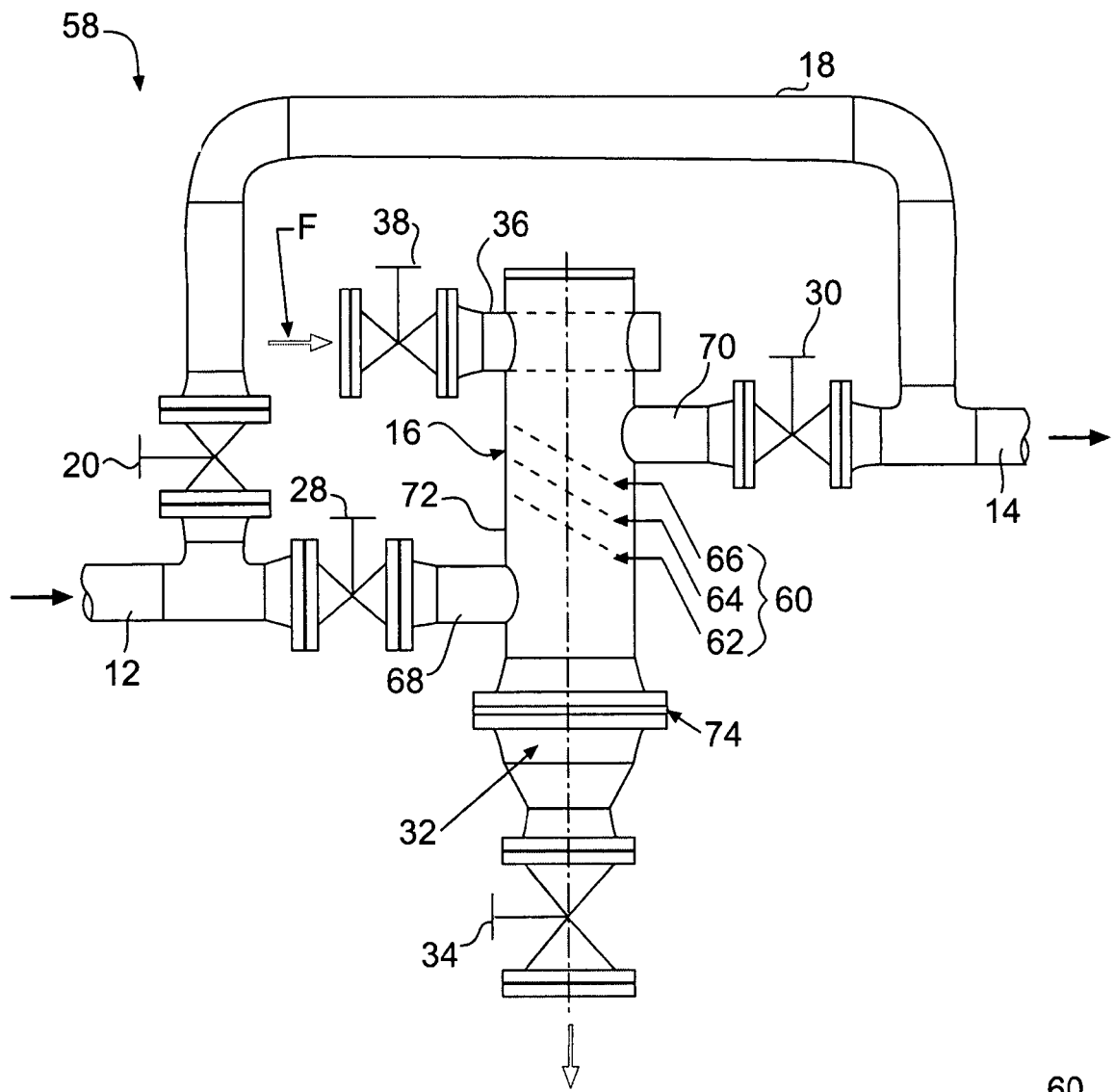
FIG. 3 is a schematic diagram of a flow circuit with a strainer device including a modified screen assembly in accordance with the invention.
Figure 4:
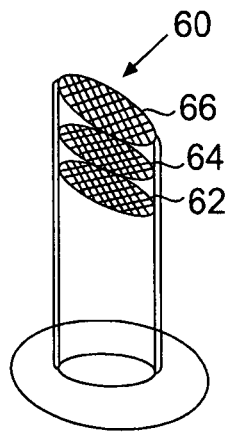
FIG. 4 is a side perspective view of a screen assembly for use with circuit of FIG. 3.

FIG. 3 shows a circuit 58 having a screen assembly 60 formed of a series of spaced, flat screen 62, 64, and 66 disposed at an angle to horizontal and tilted downward compared to the inlet. As in the screen assembly 50, the screen assembly 60 has screens 62, 64, and 66 with progressively smaller openings as the screens ascend, as seen in FIG. 4. In this arrangement, the inlet 68 and the outlet 70 are radially disposed to the main chamber 72, rather than being tangentially disposed. The remainder of the circuit 58 seen in FIG. 3 functions in the same manner as the circuit 10 in FIG. 1 and does not require further explanation separate from the assembly of FIG. 1.

The screen assembly 50 or 60 is preferably reinforced and mounted on a support to form a unitary structure. By this, the entire screen assembly 50 or 60 can be inserted into the chamber 22, 72 and removed as a unit, if necessary. The screen assembly 50 or 60 can be mounted to the body flanges 23 or 74 of the main chambers 22 or 72, respectively, by clamping therebetween, for example. Any suitable support arrangement could be used. It is also possible to permanently secure each screen element with the chamber, by welding for example.

The screen assembly 50 captures debris and solid particles as the fluid flows upwardly through the main chamber 22. The largest particles from the flow slide down the inner walls of the main chamber 22 to the collection area 32 while the smaller particles are progressively trapped by the screens 52, 54, and 56. Since the largest particles are removed first, as the liquid swirls downwardly, the screen assembly 50 is not occluded with large particles. Then, as the smaller and smallest particles are allowed to pass through the lower screens 52 and 54, a hearty flow is maintained through the chamber 22 to the outlet 26.

The distributor 36 is selectively activated to allow a back flushing fluid flow to enter the strainer device 16. The back flushing fluid can be a hydrocarbon liquid, such as Light Cycle Oil or kerosene, or water for those strainer devices that serve a water circuit. The back flushing fluid will vary depending on the particular fluid flow circuit. The back flushing stream may be provided with nitrogen or other suitable gas stream to provide an increased velocity and agitation for cleaning purposes.

As will become evident with the explanation below, the back flush is intended to flow downwardly from the back flush source via the back flush valve 38 and through the main chamber 22 to dislodge the trapped debris and hence clean each of the screens 52, 54, and 56 by sweeping the solids from the lower surfaces of the screens to the collection area 32 for disposal through debris valve 34.

In operation, when the strainer device 16 is on-line and in operation, the inlet valve 28 and the outlet valve 30 are open, and the by-pass valve 20 is closed. This directs fluid flow through the strainer device 16. Additionally, the debris valve 34 and the back flush valve 38 are closed. A stream of fluid flows through the strainer device 16 and debris and solid particles collect in the collection area 32 and on the underside of the screens 52, 54, and 56 of the screen assembly 50.

To clean the screen assembly 50 and remove debris and solid particles from the strainer device 16, the back flushing operation is activated. In this cleaning mode, the by-pass valve 20 is opened and the inlet valve 28 and the outlet valve 30 are closed. This directs the fluid flow around the strainer device 16 and through the by-pass line 18. Then, a back flushing fluid source is connected to the back flush valve 38, and the debris valve 34 is opened. The back flushing fluid source F, as noted above, can be a hydrocarbon liquid or water or some other fluid depending upon the particular application. The back flushing fluid flows downward through the strainer device 16 dislodging the particles from the screen assembly 50 and washing the collected debris from the collection area 32 out through the debris valve 34 for disposal or further processing.

Alternatively, while not preferable it is contemplated that the process stream may serve as the back flushing fluid source. The by-pass line 18 may be connected to the outlet 26 upstream of the outlet valve 30. With such an arrangement, when the valve 30 is closed, the process stream is directed into the strainer device 16 through the outlet 26 to performing the back flushing operation, described above. The process stream and debris exiting through the debris valve 34 may be fed through a strainer (not shown) mounted, for example, on a trailer mounted system such that the debris can be separated from the process stream so that the debris is not fed to the heat exchanger when the strained process stream is returned to the out-flow line 14. In order to isolate the strainer device to perform maintenance work on the strainer device while the exchanger is operational and avoid stopping the entire flow stream, an additional valve may be added immediately at the exit of the device and the start of line 26.

The flushing operation is activated for a period of time, which can be 10 minutes for example. It is not necessary to back flush for an extended period of time, but only as long as it takes to dislodge the particles from the screen assembly 50.

It is also possible to flush debris and "mud" like material from the collection area 32 of the main chamber 22 without by-passing the straining device 16. In this case, the debris valve 34 is opened for a short time, for example for about 5 seconds. Solids collected in the collection areas 32 will then be swept out through the debris valve 34. The debris valve 34 would be connected to a further processing station in the system, for example to the slop system or to a feed line to a coker.

Back flushing of the strainer device 16 requires no disassembly of any bolted flanges. Instead, back-flushing is achieved through the opening and closing of valves. As can be appreciated, this system greatly simplifies the cleaning operation of a fluid circuit and can be easily executed without removing any straining devices or without disassembling any components in the system.

Due to the presence of multiple stages of screen elements, a rapid rate of plugging is not expected to occur in the strainer device 16. The coarse screen stops the largest pieces of debris while the finest screen stops the smallest particles. With an adequate distance provided between the different screens, blockages that occur on one screen will not affect the downstream screens. The position of the collection area 32 away from the screen assembly 50 allows for the collection of large debris to avoid clogging of the screen assembly 50. This increases the efficiency of the screen assembly 50 and prevents any reduction in fluid flow that could occur due to the presence of large debris near the screening surface.

Strategic placement of strainers can reduce maintenance and the associated costs, save energy, and avoid capacity losses. The strainer device disclosed herein is placed in the circuit so that cleaning can be accomplished on-line, without the need to remove the strainer device from the circuit. If it is desired to remove or replace the strainer device 16 or the screen assembly 50 it would not require taking the circuit out of operation as the by-pass line 18 can be used to redirect flow during desired maintenance. For example, it may be desired to conduct a detailed inspection or a thorough cleaning every 5 to 10 years during plant turnarounds.

It is also feasible for the main chamber of the strainer device to be placed in an inclined position rather than in the vertical position. This arrangement may be necessary where space limitations exist or where a longer cyclone region is needed within the chamber (e.g., a water stream containing a large amount of sediment).

Figure 5:
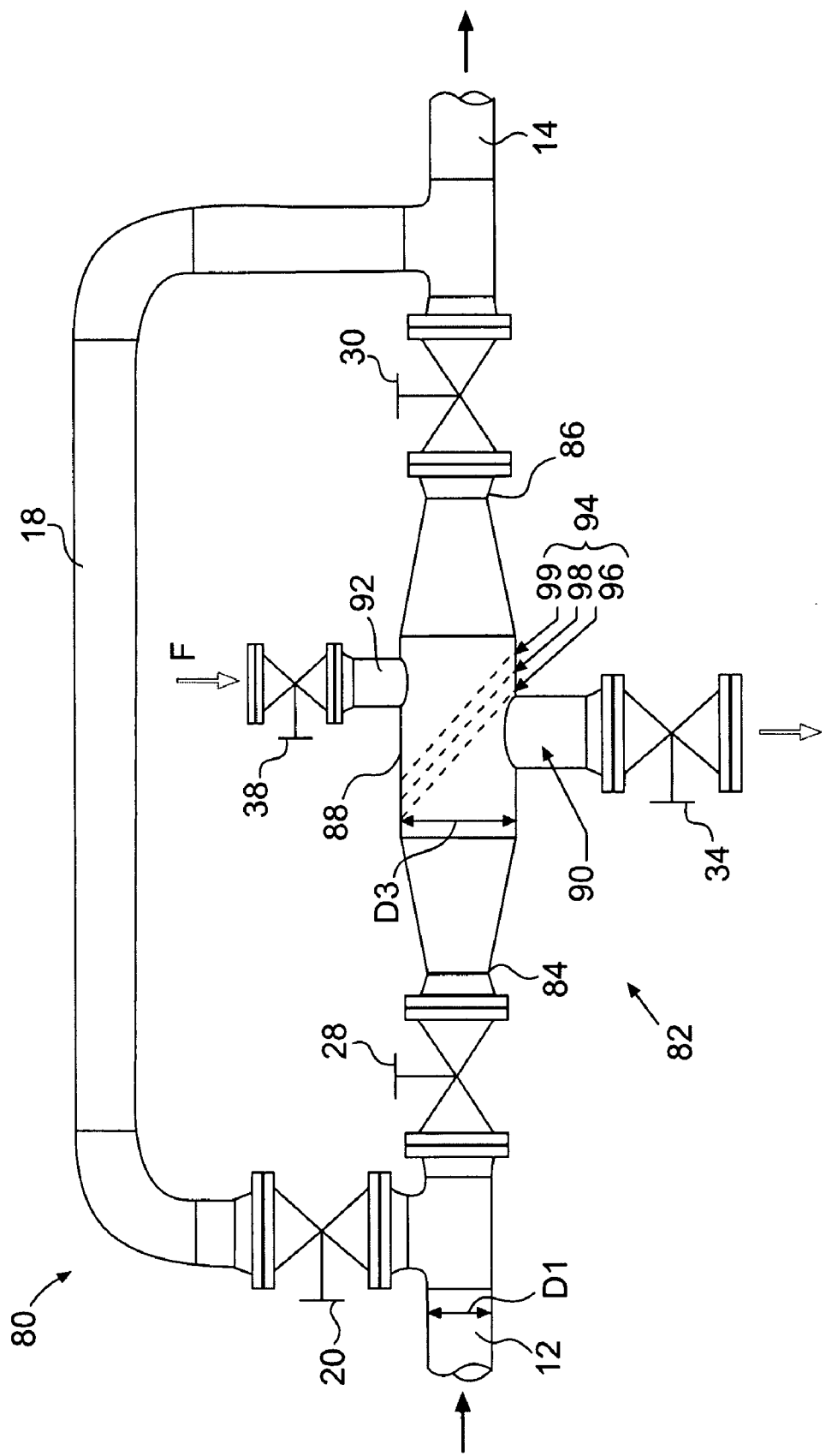
FIG. 5 is a schematic diagram of a flow circuit with a strainer device in a horizontal orientation in accordance with the invention; and, FIG. 6 is a schematic diagram of a flow circuit with a strainer device in a horizontal orientation, including a modified collection area, in accordance with the invention.

Referring to FIG. 5, a fluid flow circuit 80 is provided with a strainer device 82 having a horizontal or non-vertical orientation. In this assembly, the in-flow line 12 and out-flow line 14 are connected to a by-pass line 18 with a by-pass valve 20, as in the previous configuration. The inlet valve 28 connects to a generally horizontal inlet 84, and the outlet valve 30 connects to a generally horizontal outlet 86. A main chamber 88 extends between the inlet 84 and the outlet 86. The main chamber 88 is connected to the inlet 84 and the outlet 86 by portions that taper toward the inlet 84 and the outlet 86 to form a smooth transition between the diameters in the flow path.

As seen in FIG. 5, the main chamber 88 has a larger diameter D3 than the inner diameter D1 of the in-flow line 12 and out-flow line 14. The diameter D3 may be up to two times greater than the line diameter D1. For example, the main chamber 88 may be formed of a 16 inch pipe while the process pipe has a diameter of 10 inches.

The strainer device 82 has a large debris collection area 90 in which larger particles and debris will fall when the fluid flows into the main chamber 88 and experiences a drop in velocity due to the increase in diameter of the flow path. The bottom of the collection area 90 connects to the debris valve 34. The strainer device 82 also has a distributor or sparger 92 that connects to the top of the main chamber 88 and connects to a back flush valve 38.

A screen assembly 94 is positioned within the flow path in the main chamber 88 above the collection area 90. The screen assembly 94 includes at least one screen element that extends across the diameter D3 of the main chamber 88. In the configuration shown in FIG. 5, three screen elements 96, 98, 99 are provided. As in the previous configuration, the screen elements 96, 98, 99 have progressively smaller openings to trap progressively smaller particles of debris. Since the screen assembly 94 is disposed directly above the collection area 90, particles that impact the screen assembly 94 that are not held against a screen element 96, 98 or 99 will fall into the collection area 90.

The screen assembly 94 can be formed as a reinforced unitary piece and be mounted in the main chamber 88, such as by welding. Alternatively, the screen assembly can be removably mounted within the main chamber 88, for example, by connecting to the tapered section with a flange, similar to the configuration shown in FIGS. 1 and 3.

As the fluid flows through the main chamber 88, any particles or debris carried in the flow will either be strained from the fluid and be retained on the screen assembly 94 or fall into the collection area 90. An advantage of this arrangement is that it does not require additional space as it may merely replace a section of a horizontal line.

Back flushing of the strainer device 82 occurs in the same manner as in the circuit 10 of FIG. 1. To clean the strainer device 82 and remove debris, the by-pass valve 20 is opened, and the inlet valve 28 and outlet valve 30 are closed. The fluid flow is thereby directed through the by-pass line 18. A flushing fluid source F is connected to the back flush valve 38, which is then opened along with the debris valve 34. Flushing fluid flows downward through the distributor 92, transversely through the main chamber 88 and across the backside of the screen elements 96, 98, and 99. The flushing fluid, along with any particles swept from the screen assembly 94, then flows into the collection area 90 and out through the debris valve 34. Any debris collected in the collection area 90 will also be washed through the debris valve 34 with the flushing fluid. As noted above, it is also possible to wash debris from the collection area 90 during a normal flow operation with the strainer device 82 in operation by very briefly opening the debris valve 34 when the inlet and outlet valves 28 and 30 are open and the back flush valve 38 is closed.

The screen assembly 94 shown in fluid flow circuit 80 is formed as a series of spaced, flat screen elements disposed at an angle to vertical. As seen in FIG. 5, the screen collection surfaces slope downwardly in the direction of the fluid flow. The bottom of the first screen element 96 is positioned at the entry to the collection area 90 to direct particles into the collection area. It is also possible to orient them at a different angle or to use a different shape screen element if desired, depending on the particular application. As can be appreciated from the drawing, access to the screen assembly 94 is quite easy in this arrangement.

Figure 6:
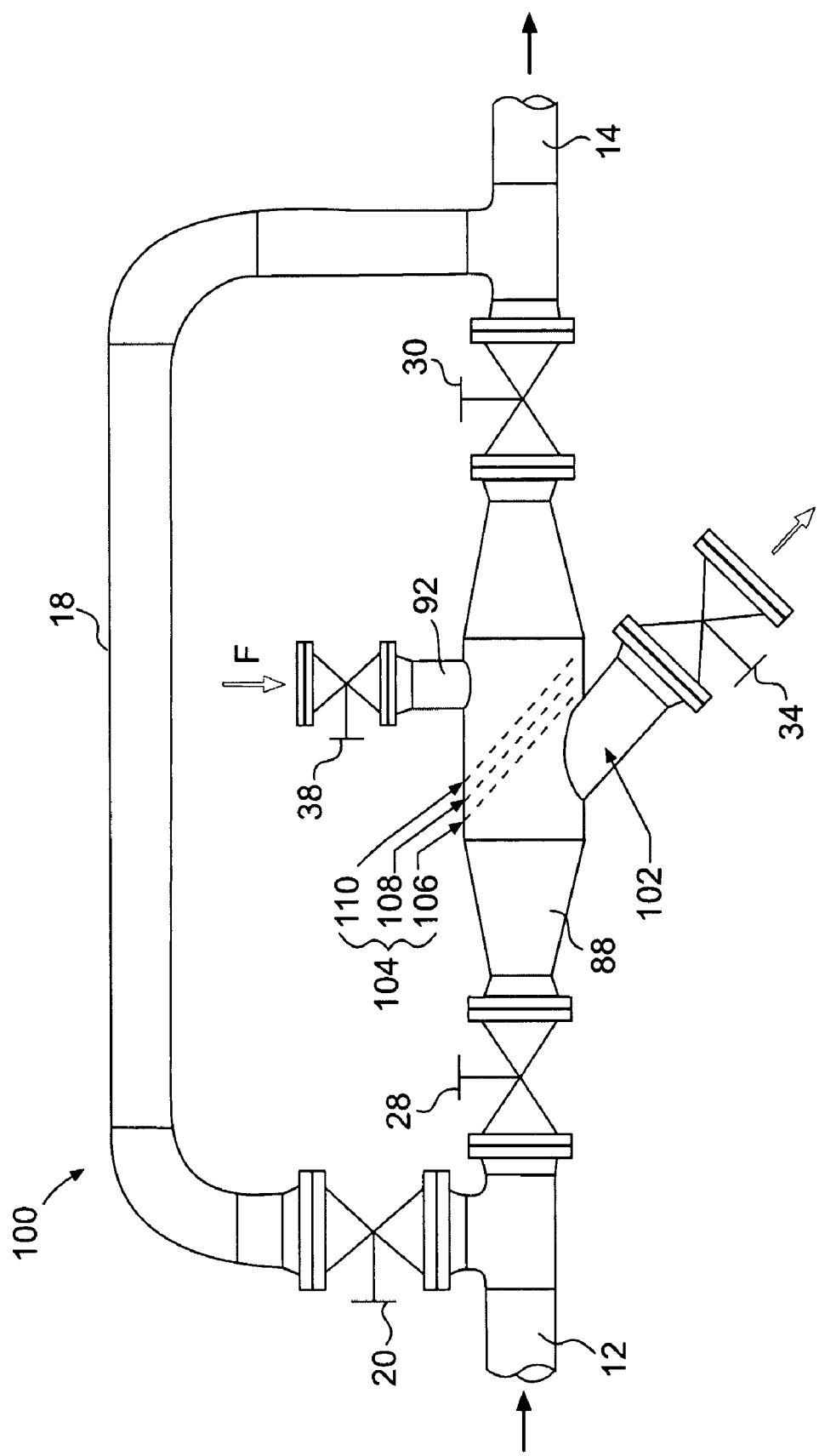

FIG. 6 shows a fluid flow circuit 100 that is similar to fluid flow circuit 80, but has an angled collection area 102. In this case, the collection area 102 is positioned at an angle and slopes downwardly in the direction of the fluid flow. As seen, the collection area 102 is formed as a pipe that extends in a direction that is generally parallel to the screen assembly 104 with each screen element 106, 108, and 110 having a surface that also extends in the same direction.

The bottom of the first screen element 106 is positioned at the entry to the collection area 102 so that particles will be swept into the collection area 102 during fluid flow from falling in to the collection area 102 due to gravity or by falling from the surface of the screen elements 106, 108, and 110 from gravity.

Again, the distributor 92 is positioned on the opposite side of the screen assembly 104 than the collection area 102 so that flushing fluid flows backwards through the screen assembly 104 to wash debris collected on the screen elements 106, 108, and 110 into the collection area 102 for removal through debris valve 34.

The arrangements shown in FIGS. 5 and 6 are inexpensive to install and manufacture and thus offer a less expensive alternative. It is also possible to simply remove the strainer device and install a new one when needed or during plant turn arounds. The used device can be cleaned, with an acid solution or by baking in an oven, for example, and reused.

Of course, any type of screen assembly can be used interchangeably in the various circuits. The shape, number and arrangement of the screens can vary.

The valves may be any known type of valve element used in a fluid flow situation. For example, the valves may be designed to prevent back flow. They may have additional safeguards against leakage, such as being double-block type valves where the nature of the fluid stream being conditioned requires leakage protection.

The strainer device and the method of operating the strainer device disclosed herein can be used with any fluid flow circuit. One practical application is in combination with a petroleum refining process. Another practical application is in combination with a heat exchange process. In these applications, the fluid flow circuit connects to the process line that leads to a further processing operation, for instance a heat exchange operation in which the fluid will flow in a restricted passage. In this case, it is desirable to have flow that is free of solid particles that can plug the process line. It is also desirable in a refinery setting, in particular, to use this device in fluid streams that are susceptible to fouling.

Various modifications can be made in our invention as described herein, and many different embodiments of the device and method can be made while remaining within the spirit and scope of the invention as defined in the claims without departing from such spirit and scope. It is intended that all matter contained in the accompanying specification shall be interpreted as illustrative only and not in a limiting sense.

What is claimed is:

1. A strainer device, comprising:
    a tubular main chamber with a hollow interior with a top and a bottom and a longitudinal axis that is generally vertically oriented;
    a generally horizontal inlet with a tangential inlet flow nozzle;
    a generally horizontal outlet coupled to the main chamber, wherein a fluid flow path is defined from the inlet to the outlet through the hollow interior of the main chamber;
    a collection area at the bottom of the main chamber, wherein the collection area is offset from the flow path;
    a pipe internal to the main chamber and with the inner wall of the main chamber, defining an annular flow path from the inlet, downwards from the inlet and then upwards within the pipe, the pipe having at least one external helical guide vane to impart a swirling motion to the fluid in its downwards flow;
    a distributor connected to the top of the main chamber with a back flush valve to couple the distributor selectively to a flushing fluid source to provide a flow of flushing fluid into the main chamber;
    said at least one helical guiding vane on the exterior of the pipe and,
    a screen assembly positioned within the hollow interior in the flow path between the inlet and the outlet and between the distributor and the collection area and at the top of the internal pipe, wherein the screen assembly includes a plurality of spaced screen elements with openings sized to collect solid particles from fluid flowing in the fluid flow path, wherein each screen element has openings progressively smaller in the direction of the fluid flow path.

2. The strainer device of claim 1, in combination with a fluid flow circuit having an in-flow line and an out-flow line connected to the inlet and the outlet of the strainer device, respectively.

3. The strainer device of claim 2, further comprising a by-pass assembly connected to the in-flow line and the out-flow line in parallel to the strainer device, wherein the by-pass assembly includes a by-pass line and a by-pass valve coupled to the in-flow line upstream of the inlet.

4. The strainer device of claim 1, wherein the main chamber has an open bottom in communication with the collection area.

5. The strainer device of claim 1, wherein the collection area extends outwardly below the main chamber.

6. The strainer device of claim 1, further comprising a valve coupled to the inlet and a valve coupled to the outlet.

7. The strainer device of claim 1, further comprising said back flush valve coupled to the distributor and a debris valve coupled to the collection area, wherein a back flushing fluid flow path is defined between the back flush valve and the debris valve from the distributor to the collection area such that opening the back flush valve selectively permits back flushing fluid to flow through the screen assembly in a direction opposite to the fluid flow path.

* * * * *